United States Patent
Lee

(10) Patent No.: US 9,868,464 B2
(45) Date of Patent: Jan. 16, 2018

(54) ELECTRIC POWER STEERING APPARATUS AND CONTROL METHOD THEREOF

(71) Applicant: MANDO CORPORATION, Pyeongtaek-si, Gyeonggi-do (KR)

(72) Inventor: Sunggun Lee, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/968,807

(22) Filed: Dec. 14, 2015

(65) Prior Publication Data
US 2016/0167707 A1   Jun. 16, 2016

(30) Foreign Application Priority Data

Dec. 15, 2014   (KR) .................. 10-2014-0180172

(51) Int. Cl.
*B62D 15/02*   (2006.01)
*B62D 6/10*   (2006.01)

(52) U.S. Cl.
CPC .............. *B62D 15/029* (2013.01); *B62D 6/10* (2013.01); *B62D 15/021* (2013.01); *B62D 15/025* (2013.01)

(58) Field of Classification Search
CPC ...... B62D 15/029; B62D 15/025; B62D 6/10; B62D 15/021
See application file for complete search history.

(56) References Cited

U.S. PATENT DOCUMENTS

| | | | | |
|---|---|---|---|---|
| 6,256,561 B1 * | 7/2001 | Asanuma | ............. | B62D 15/025 180/197 |
| 6,389,342 B1 * | 5/2002 | Kanda | .................... | B62D 5/006 180/443 |
| 6,493,619 B2 * | 12/2002 | Kawazoe | ............. | B62D 15/025 180/168 |
| 6,778,890 B2 * | 8/2004 | Shimakage | .......... | B62D 15/025 180/443 |

(Continued)

FOREIGN PATENT DOCUMENTS

| | | |
|---|---|---|
| CN | 1958373 A | 5/2007 |
| CN | 102372027 A | 3/2012 |

(Continued)

OTHER PUBLICATIONS

Korean Office Action dated Nov. 2, 2015 in connection with the counterpart Korean Patent Application No. 10-2014-0180172.

(Continued)

*Primary Examiner* — Jerrah Edwards
*Assistant Examiner* — Majdi Alsomiri
(74) *Attorney, Agent, or Firm* — Hauptman Ham, LLP

(57) ABSTRACT

The present invention relates to an electric power steering apparatus for determining whether a driver keeps hold of a steering wheel and a control method thereof that can calculate a steering torque model value from a steering torque value, steering torque information, and a steering torque model equation, and can accurately determine whether the driver keeps hold of the steering wheel by using a result obtained by comparing the steering torque model value with first and second reference torques and the counter value of a counter that is updated according to the comparison result.

12 Claims, 8 Drawing Sheets

(56) References Cited

U.S. PATENT DOCUMENTS

| | | | | |
|---|---|---|---|---|
| 7,558,662 B2* | 7/2009 | Yamaguchi | ......... | B60T 8/17552 180/412 |
| 2002/0169531 A1* | 11/2002 | Kawazoe | ............. | B62D 15/025 701/41 |
| 2003/0078712 A1* | 4/2003 | Shimakage | ............ | B62D 1/286 701/41 |
| 2010/0094505 A1* | 4/2010 | Kariatsumari | ....... | B62D 5/0472 701/41 |
| 2012/0041645 A1* | 2/2012 | Benyo | .................. | B62D 5/0466 701/42 |

FOREIGN PATENT DOCUMENTS

| | | |
|---|---|---|
| CN | 104029683 A | 9/2014 |
| DE | 102008021150 A1 | 8/2009 |
| DE | 102011002401 A1 | 7/2012 |
| FR | 2890632 A1 | 3/2007 |
| JP | H11-245836 A | 9/1999 |
| JP | 2008-221967 A | 9/2008 |
| KR | 1020110101599 A | 9/2011 |

OTHER PUBLICATIONS

German Office Action dated Aug. 7, 2017 from DPMA in connection with the counterpart German Patent Application No. 10 2015 016 217.9.

Chinese Office Action dated Aug. 2, 2017 from SIPO in connection with the counterpart Chinese Patent Application No. 201510937272.9.

* cited by examiner

FIG. 7
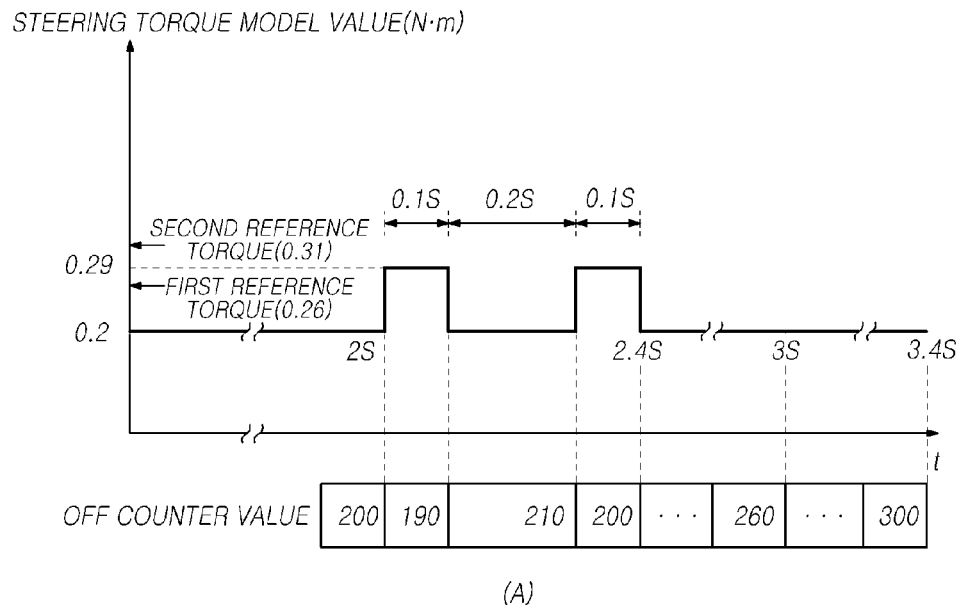
(A)
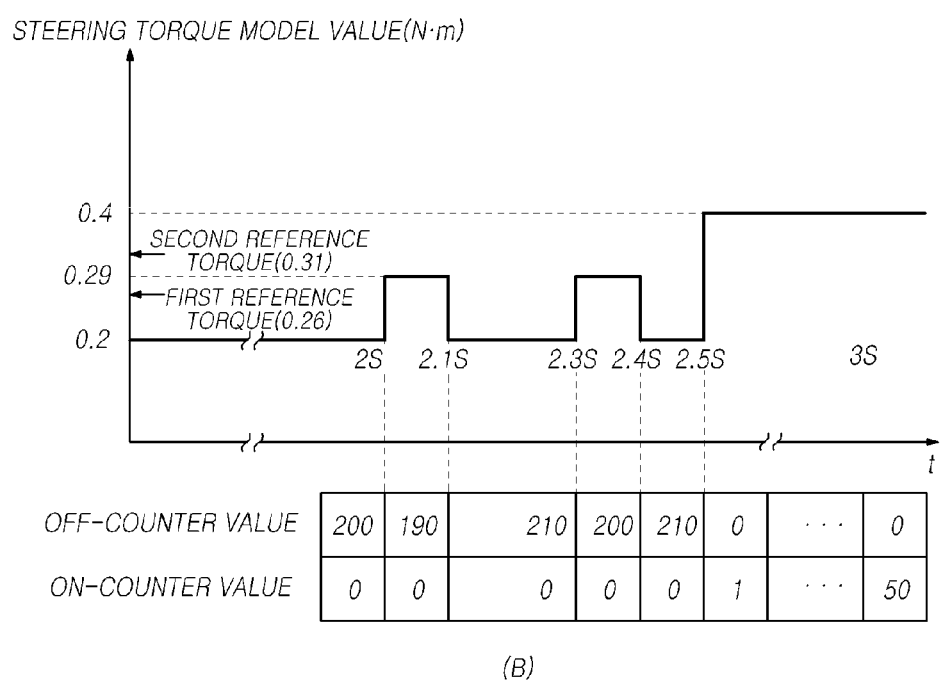
(B)

ELECTRIC POWER STEERING APPARATUS AND CONTROL METHOD THEREOF

CROSS-REFERENCE TO RELATED APPLICATION

This application claims priority from and the benefit under 35 U.S.C. §119(a) of Korean Patent Application No. 10-2014-0180172, filed on Dec. 15, 2014, which is hereby incorporated by reference for all purposes as if fully set forth herein.

BACKGROUND OF THE INVENTION

1. Field of the Invention

The present invention relates to an electric power steering apparatus and a control method thereof and, more specifically, to an electric power steering apparatus and a control method that can determine whether a driver keeps hold of a steering wheel.

2. Description of the Prior Art

In general, vehicles have auxiliary steering systems as a means for reducing a steering force of a steering wheel to ensure stability of a steering state. In the related art, Hydraulic Power Steering Systems (HPSs) using hydraulic pressure have been widely used as auxiliary steering systems for vehicles. However, these days, eco-friendly Electric Power Steering Systems (EPSs), which reduce a steering force using a rotating force of a motor as opposed to the related art using hydraulic pressure, are usually equipped to vehicles in order to enable drivers to easily steer their vehicles.

In the electric power steering systems (EPSs), Electronic Control Units (ECUs) drive motors according to driving conditions of vehicles, which are detected by vehicle speed sensors, steering angle sensors, torque sensors, etc., to provide a light and convenient feeling of steering at a low speed and good directional stability as well as a heavy feeling of steering at a high speed and to provide a rapid restoring force according to rotation angles of steering wheels so that rapid steering can be performed in an emergency situation, thereby providing optimum steering conditions to drivers.

Meanwhile, among various types of technologies that are added in order to ensure driving stability, lane keeping control systems have been increasingly used to prevent lane departure caused by drivers' drowsy or careless driving.

Lane keeping control systems control actuators of steering control systems by using lane information (e.g., the location, width, curvature, or the like of a lane), which is acquired through cameras, to assist drivers to drive their vehicles while stably keeping lanes. Examples of the lane keeping control systems include a Lane Keeping Assist System (LKAS), a lane keeping system, a lane departure prevention system, and the like.

The roles of such lane keeping control systems are limited to a function of providing assist torques in order to make drivers keep their lanes. Accordingly, in cases where drivers do not keep hold of steering wheels, it is required to make an alert by rapidly detecting dangerous situations due to the hands-off state of the steering wheels.

However, steering wheel hands-off detection technologies in the related art simply use torque values that are output from torque sensors, and thus, there may be a difference between the torque values and the actual torque levels acting on steering wheels.

Further, in the steering wheel hands-off detection technologies, a determination as to whether a driver does not keep hold of a steering wheel is made by simply comparing an output value of a torque sensor of a steering system with a threshold value. Therefore, an error in the determination may arise when a steering torque value temporarily varies according to a road condition, etc.

SUMMARY OF THE INVENTION

An exemplary embodiment of the present invention provides an electric power steering apparatus using a steering torque model equation and a control method thereof that can acquire a more accurate steering wheel torque.

Further, an exemplary embodiment of the present invention provides an electric power steering apparatus and a control method thereof that can differently determine the holding state of a steering wheel when a torque level instantaneously varies according to a road condition.

In addition, the present invention provides a technology of separating a reference torque, which is a threshold value compared with a steering torque value by a steering torque model, into first and second reference torque values and controlling an on-counter and an off-counter according to the magnitudes of the calculated steering torque value and the two reference torque values, thereby preventing an error in a determination as to whether a driver keeps hold of a steering wheel when a torque signal temporarily varies according to a road condition, etc.

In accordance with one aspect of the present invention, an electric power steering apparatus includes: a torque sensor that detects a steering torque applied to a steering wheel of a vehicle and outputs an electrical signal corresponding to the detected steering torque; a steering angle sensor that outputs an electrical signal corresponding to the rotation angle of the steering wheel; a steering torque calculation unit that calculates a steering torque model value through a predefined steering torque model equation by using the electrical signals that are output from the torque sensor and the steering angle sensor; a holding state determination unit that determines a hands-off state in which a driver does not keep hold of the steering wheel, by using the steering torque model value calculated by the steering torque calculation unit; and an off-counter that updates a counter value at every period of determination, wherein the holding state determination unit determines the hands-off state of the steering wheel by using a first reference torque, a second reference torque larger than the first reference torque, and the accumulated counter value of the off-counter.

The holding state determination unit may: determine, at every period of determination, whether the absolute value of the calculated steering torque model value is less than or equal to the first reference torque; increase the counter value of the off-counter by a predetermined value only when the absolute value of the calculated steering torque model value is less than or equal to the first reference torque; determine that the driver does not keep hold of the steering wheel when the accumulated counter value of the off-counter reaches a first reference counter value corresponding to a first reference time; and decrease the counter value of the off-counter by a predetermined value when the absolute value of the steering torque model value exceeds the first reference torque and is less than the second reference torque.

The electric power steering apparatus may further include an on-counter, the counter value of which is updated at every period of determination, and the holding state determination unit may: determine, at every period of determination, whether the absolute value of the calculated steering torque model value exceeds the second reference torque; increase the counter value of the on-counter by a predetermined value only when the absolute value of the calculated steering torque model value exceeds the second reference torque; determine that the driver keeps hold of the steering wheel when the accumulated counter value of the on-counter reaches a second reference counter value corresponding to a second reference time; and decrease the counter value of the on-counter by a predetermined value when the absolute value of the steering torque model value exceeds the first reference torque and is less than the second reference torque.

A hands-off sign may be output when the holding state determination unit determines that the driver does not keep hold of the steering wheel.

In accordance with another aspect of the present invention, a method of controlling an electric power steering apparatus by using a device that includes a steering torque calculation unit, an off-counter, and a holding state determination unit, includes: a steering torque calculation step of calculating, by the steering torque calculation unit, a steering torque model value through a predefined steering torque model equation by using steering torque information from a torque sensor and steering angle information from a steering angle sensor; a counter update step of updating the counter value of the off-counter at every period of determination according to a result obtained by comparing the steering torque model value with a first reference torque and a second reference torque larger than the first reference torque; and a holding state determination step of determining, by the holding state determination unit, whether a driver keeps hold of a steering wheel based on the counter value of the off-counter.

In this case, the first reference counter value may be larger than the second reference counter value.

The method may further include making an alert for releasing the operation of a lane keeping control system, which is provided in the vehicle, when it is determined that the driver does not keep hold of the steering wheel.

According to the electric power steering apparatus and the control method thereof, according to the exemplary embodiment of the present invention, whether a driver keeps hold of a steering wheel can be accurately determined by using a steering torque model value that is derived from modeling of a steering system, other than a actually measured steering torque value.

Further, a steering wheel is determined to be in a hands-off state only when a steering torque model value is less than or equal to a minimum reference value (the first reference torque) for a predetermine period of time (the first reference time), and compensation is conducted by gradually decreasing a counter value when the steering torque model value minutely varies between two reference values (the first and second reference torques), thereby accurately and carefully determining whether a driver keeps hold of the steering wheel even when the steering torque temporarily varies according to a road condition, etc.

In addition, a configuration for setting the first reference time, on the basis of which a steering wheel is determined to be in a hands-off state, to be greater than the second reference time, on the basis of which the steering wheel is determined to be in a holding state, or a configuration for making an alert regarding the release of a lane keeping control system according to the determination that a steering wheel is in a hands-off state is provided to carefully determine whether to complete the operation of the lane keeping control system according to the determination that the steering wheel is in the hands-off state, thereby ensuring stability of a vehicle.

BRIEF DESCRIPTION OF THE DRAWINGS

The above and other objects, features, and advantages of the present invention will be more apparent from the following detailed description taken in conjunction with the accompanying drawings, in which:

FIGS. 7A and 7B illustrate a variation in a steering torque model value according to time and a variation in values of an on-counter and an off-counter according to the steering torque variation.

DETAILED DESCRIPTION OF THE EXEMPLARY EMBODIMENTS

Figure 1:
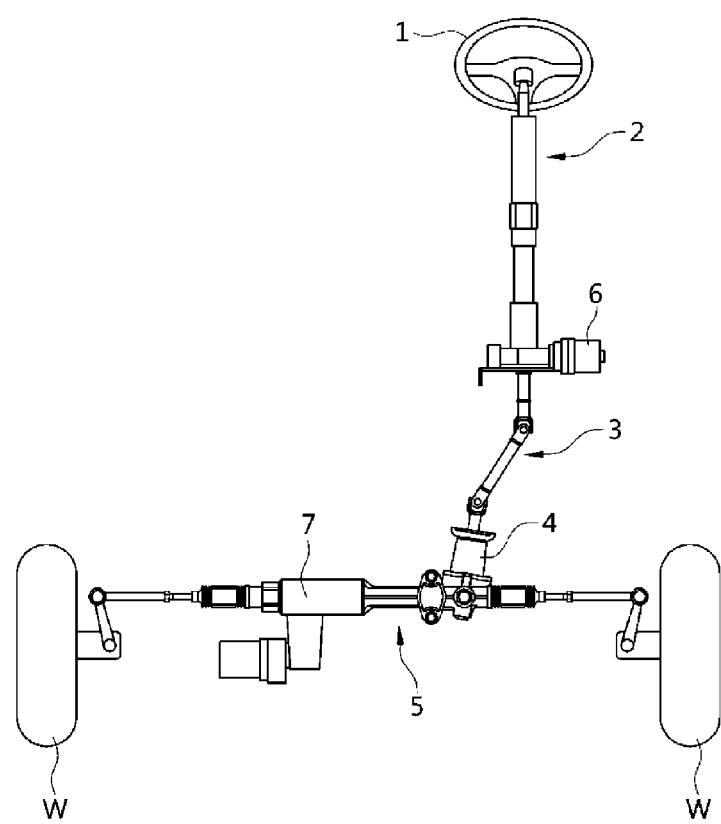
FIG. 1 illustrates an internal structure of a vehicle to which an electric power steering apparatus is applied, according to an exemplary embodiment of the present invention.

Hereinafter, exemplary embodiments of the present invention will be described in detail with reference to the accompanying drawings. The following embodiments are provided to fully convey the spirit of the present invention to those skilled in the art to which the present invention pertains. The present invention is not limited to the embodiments disclosed herein and may also be implemented in different forms. In the drawings, parts that bear no relation to descriptions may be omitted in order to clarify the present invention, and elements may be exaggerated in sizes thereof for ease of understanding.

Figure 2:
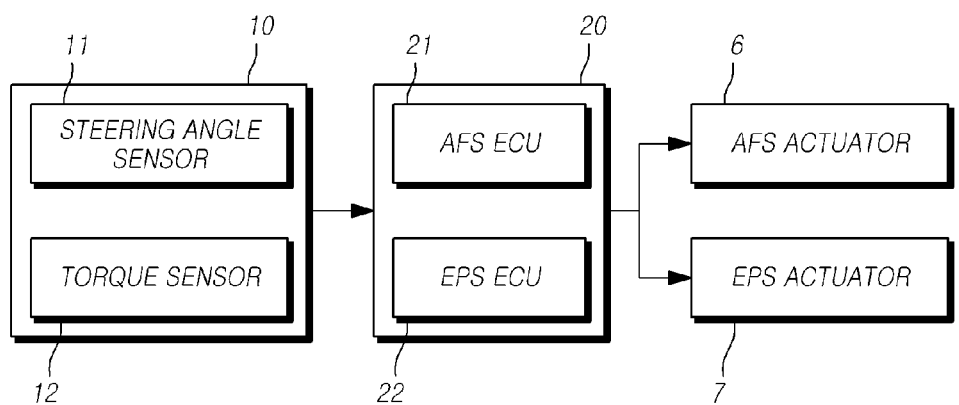
FIG. 2 is a control block diagram of the electric power steering apparatus, according to an exemplary embodiment of the present invention.

An electric power steering apparatus and a control method thereof, according to an exemplary embodiment of the present invention, will be described with reference to FIGS. 1 and 2. FIG. 1 illustrates an internal structure of a vehicle to which an electric power steering apparatus is applied, according to an exemplary embodiment of the present invention. FIG. 2 is a control block diagram of the electric power steering apparatus, according to an exemplary embodiment of the present invention.

As illustrated in FIG. 1, the electric power steering apparatus may include a steering wheel 1 for a driver's operation, a steering column 2 connected to the steering wheel 1, a pinion shaft 3 having a pinion 4 provided on one end thereof, a rack shaft 5 that connects the pinion 4 and wheels W, and an Electronic Power Steering (EPS) system provided on the rack shaft 5.

The EPS system detects the driver's operation of the steering wheel 1 to drive an EPS actuator 7 and rotate the rack shaft 5 connected to the EPS actuator 7 so that the driver can steer the vehicle with a small force.

Meanwhile, the electric power steering apparatus, according to the exemplary embodiment of the present invention, may further include an Active Front Steering (AFS) system. The AFS system acquires vehicle status information or driving information according to the driver's operation of the steering wheel 1, and calculates an appropriate steering gear ratio to drive an AFS actuator 6 and rotate the pinion 4 connected to the AFS actuator 6 according to the calculated steering gear ratio. Due to the rotation of the pinion 4, the rack shaft 5 horizontally moves so that the wheels on opposite ends of the rack shaft 5 move, thereby assisting with the steering.

The AFS system is an example of a system that may be included in the exemplary embodiment of the present invention, and the purpose of the present invention may be achieved even when only the EPS system is included in the exemplary embodiment of the present invention.

The electric power steering apparatus may execute the AFS system and the EPS system together to assist the driver to more comfortably steer the vehicle. For example, the electric power steering apparatus may control to increase an actual steering angle to be larger than the driver's steering input while the vehicle stops or travels at a low speed, thereby enhancing driver convenience, and may control to decrease an actual steering angle to be smaller than the driver's steering input while the vehicle travels at a high speed, thereby enhancing the stability of the vehicle.

The electric power steering apparatus may include a signal unit 10. The signal unit 10 may acquire various types of information of the vehicle and may forward the acquired information to a control unit. For instance, the signal unit 10 may include a steering angle sensor 11, a torque sensor 12, or the like.

The steering angle sensor 11 outputs an electrical signal that corresponds to a rotation angle of the steering wheel 1. Namely, the steering angle sensor 11 detects a steering angle and a steering angular velocity. In other words, the steering angle sensor 11 may detect the rotation angle of the steering wheel 1 according to the driver's operation of the steering wheel 1, or may detect the angle of rotation of the steering column 2 that is generated when the driver operates the steering wheel 1. Accordingly, the steering angle sensor 11 may be provided on the steering wheel 1 or the steering column 2.

The torque sensor 12 detects a steering torque that the driver applies to the steering wheel 1 and outputs an electrical signal that corresponds to the detected steering torque. The torque sensor 12 may also detect the rotation angle and speed of the pinion 4 and may be provided on one end of the pinion shaft 3, that is, on the pinion 4.

The torque sensor 12 is mounted on the steering column 2 to detect a torque that the driver applies to the steering wheel 1 and to output an electrical signal proportional to the detected torque. In this case, the torque sensor 12 outputs a positive or negative electrical signal according to the rotational direction of the steering column 2. For example, the torque sensor 12 outputs a positive electrical signal when the steering column 2 rotates from the left end to the central position, or from the central position to the right end. In contrast, the torque sensor 12 outputs a negative electrical signal when the steering column 2 rotates from the right end to the central position, or from the central position to the left end.

Here, the left end refers to a location where the steering wheel 1 cannot rotate any more in the counterclockwise direction, and the right end refers to a location where the steering wheel 1 cannot rotate any more in the clockwise direction. Further, the central position refers to a state in which the wheels W are parallel to the vehicle body, that is, a state in which the steering wheel 1 is not rotated.

Meanwhile, the steering angle sensor 11 may output an electrical signal that is proportional to the rotation angle of the steering wheel 1 that is generated when the driver rotates the steering wheel 1, and may generate a positive or negative electrical signal according to the rotational direction of the steering wheel 1. For instance, the steering angle sensor 11 generates a positive electrical signal when the driver rotates the steering wheel 1 from the central position to the right end, or from the right end to the central position. In contrast, the steering angle sensor 11 generates a negative electrical signal when the driver rotates the steering wheel 1 from the central position to the left end, or from the left end to the central position.

When the steering wheel 1 rotates from the central position to the right end, a positive electrical signal is generated from the steering angle sensor 11, and a positive electrical signal is generated from the torque sensor 12. In addition, when the steering wheel 1 rotates from the central position to the left end, a negative electrical signal is generated from the steering angle sensor 11, and a negative electrical signal is generated from the torque sensor 12.

Namely, when the steering wheel 1 rotates from the central position to the right end, the positive electrical signals are generated from both the steering angle sensor 11 and the torque sensor 12 so that the electrical signal from the steering angle sensor 11 has an identical sign to that from the torque sensor 12. Likewise, when the steering wheel 1 rotates from the central position to the left end, the negative electrical signals are generated from both the steering angle sensor 11 and the torque sensor 12 so that the electrical signal from the steering angle sensor 11 has an identical sign to that from the torque sensor 12.

Meanwhile, the signal unit 10 may include a vehicle speed sensor (not illustrated). The vehicle speed sensor detects the speed of the vehicle, that is, the vehicle speed. The vehicle speed sensor may also detect the lateral acceleration or the yaw rate of the vehicle, as well as the vehicle speed.

The electric power steering apparatus may include the control unit 20. The control unit 20 may receive a signal regarding vehicle information from the signal unit and may operate or process the received signal. Further, the control unit 2 may transmit signals to various devices of the vehicle. For instance, the control unit 20 may be an Electronic Control Unit (ECU). The ECU may include an AFS ECU 21 that drives the AFS actuator 6 and an EPS ECU 22 that drives the EPS actuator 7.

The AFS ECU 21 calculates a steering gear ratio based on a value detected by at least one of the vehicle speed sensor, the steering angle sensor 11, and the torque sensor 12, which are included in the signal unit 10, and outputs a control signal to the AFS actuator 6 in order to drive the AFS actuator 6 according to the calculated steering gear ratio.

For example, the AFS ECU 21 may calculate the steering gear ratio in response to a vehicle speed, which is detected by the vehicle speed sensor, by using a gear ratio map, etc. Here, the gear ratio map refers to a table or a graph in which appropriate steering gear ratios have been set in advance according to vehicle speeds and input angles. When the steering gear ratio is completely calculated, the AFS ECU 21 may generate a control signal such that a ratio of the output angle of the vehicle wheels W to the input angle, which corresponds to the steering angle of the steering wheel 1 that is detected by the steering angle sensor 11, satisfies the steering gear ratio, and may transmit the generated control signal to the AFS actuator 6.

Figure 3:
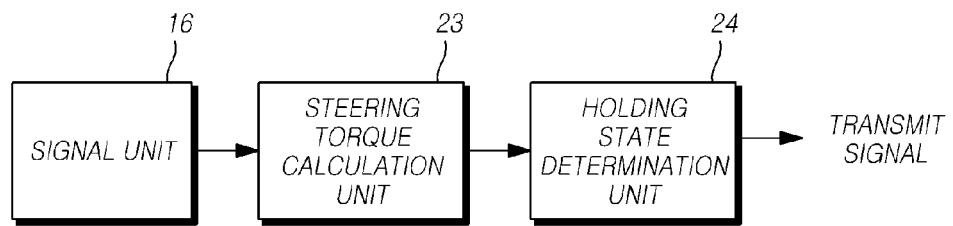
FIG. 3 is a block diagram illustrating a configuration for determining a holding state of a steering wheel.
Figure 4:
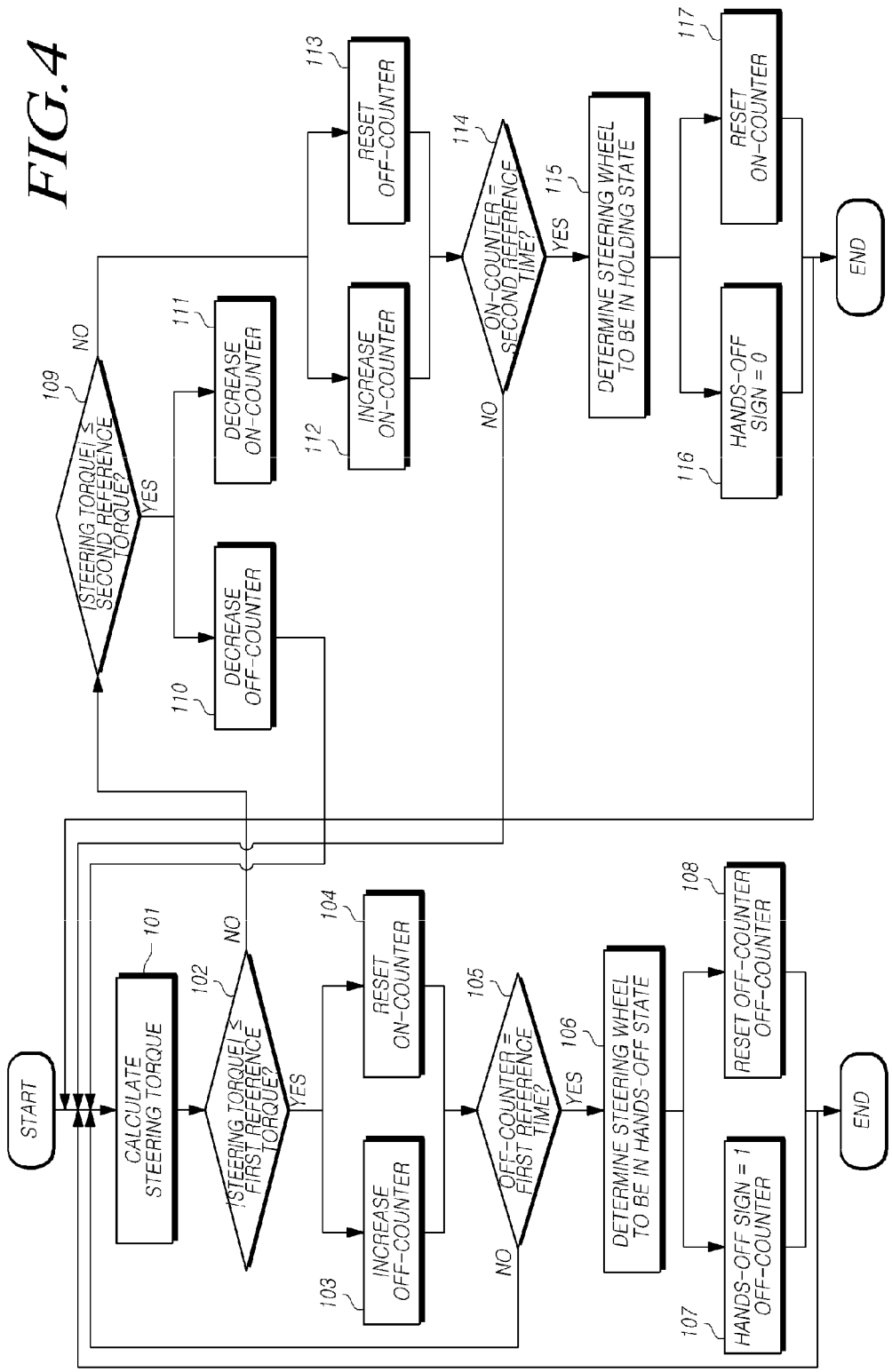
FIG. 4 is a flowchart illustrating a method for determining a holding state of a steering wheel.
Figure 5:
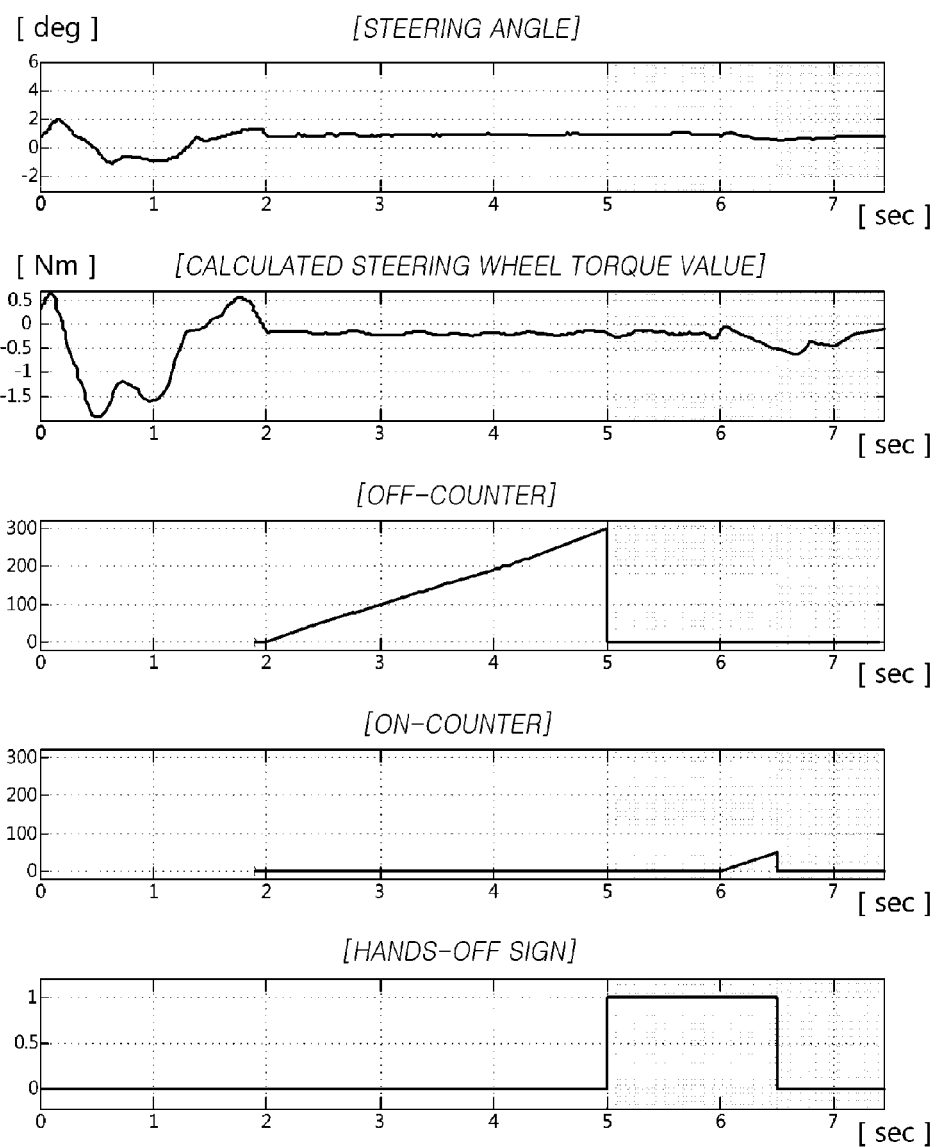
FIG. 5 is graphs used for determining a holding state of a steering wheel.

Next, a configuration and method, according to an exemplary embodiment of the present invention, in which the electric power steering apparatus determines whether a driver keeps hold of the steering wheel 1, will be described below with reference to FIGS. 3 to 5. FIG. 3 is a block diagram illustrating a configuration for determining a holding state of the steering wheel 1, FIG. 4 is a flowchart illustrating a method for determining a holding state of the steering wheel 1, and FIG. 5 is graphs used for determining a holding state of the steering wheel 1.

Referring to FIG. 3, the electric power steering apparatus, according to the exemplary embodiment of the present invention, may include: a steering torque calculation unit 23 that calculates a steering torque model value through a signal input from the signal unit 10 and a predefined steering torque model equation; and a holding state determination unit 24 that determines whether a driver keeps hold of the steering wheel 1 by using the calculated steering torque model value.

A state in which the driver keeps hold of the steering wheel 1 and a state in which the driver does not keep hold of the steering wheel 1 may be distinguished from each other by a change in a torque level. Although the torque level may be determined by using a signal input from the torque sensor 12, the output of the torque sensor 12 may differ from the actual torque level acting on the steering wheel 1. That is, the steering torque may be more accurately obtained in view of the amount of torques acting on the steering wheel 1 and the torque sensor 12.

The steering torque model equation used herein may be defined in terms of variables, including a steering angle speed, a steering angle acceleration, a steering torque offset, etc. Further, the steering torque model equation may be defined using one or more of a coefficient of viscosity, a coefficient of inertia, etc., in addition to the aforementioned variables (including the steering angle speed, the steering angle acceleration, the steering torque offset, etc.). The steering torque model equation may be represented by an illustrative equation, such as Equation 1 below.

$$T_{SW}=J_{EPS}\alpha_{SW}+C_S\omega_{SW}+T_{SENSOR}$$ [Equation 1]

In Equation 1, $T_{SW}$ denotes the finally obtained steering torque model value, $\omega_{SW}$ is the variable for the steering angle speed, $\alpha_{SW}$ is the variable for the steering angle acceleration, and $T_{SENSOR}$ is the variable considering a torque value input from the torque sensor 12. Further, in Equation 1, $C_S$ denotes the coefficient of viscosity, and $J_{EPS}$ denotes the coefficient of inertia. In this case, $C_S$ may be derived by testing a unique damping performance using a method of applying a torque to the steering wheel 1 and then releasing the torque from the steering wheel 1 under the condition of a fixed load, and $J_{EPS}$ may be obtained by adding the moment of inertia of the steering wheel 1 and the moment of inertia of the steering column 2.

Meanwhile, $T_{SENSOR}$ is obtained from the torque value input from the torque sensor 12 in view of the steering torque offset. For example, a torque value in a situation where there is no torque variation may be taken as the steering torque offset, and correction may be made through a method of subtracting the steering torque offset from the torque value input from the torque sensor 12.

Referring to FIG. 3, the electric power steering apparatus, according to the exemplary embodiment of the present invention, may include: the steering torque calculation unit 23 that calculates a steering torque model value through a predefined steering torque model equation using electrical signals output from the signal unit 10; and the holding state determination unit 24 that determines a hands-off state in which a driver does not keep hold of the steering wheel 1, by using the steering torque model value calculated by the steering torque calculation unit 23.

The steering torque calculation unit 23 may calculate a more reliable steering torque value using the predefined steering torque model equation, instead of using a torque value input from the torque sensor 12 as it is, wherein the obtained value is referred to as a steering torque model value. Meanwhile, an example of the steering torque model equation is given by Equation 1 above. Namely, the steering torque calculation unit 23 may calculate a steering angle measured by the steering angle sensor and a steering angle speed and a steering angle acceleration that are time derivatives of the steering angle, may calculate a torque value from the torque sensor, an offset thereof, etc., and may then calculate a steering torque model value using the aforementioned Equation 1.

The holding state determination unit 24 may determine the steering wheel 1 to be in a hands-off state in cases where the absolute value of the calculated steering torque model value continues to be less than or equal to a first reference torque for a first reference time. The first reference torque and the first reference time may be determined through experiments. For instance, the first reference torque may be 0.26 Nm, and the first reference time may be 3 seconds.

In cases where the holding state determination unit 24 immediately determines the steering wheel to be in the hands-off state when the steering torque model value is less than or equal to the first reference torque, a possibility of making an erroneous determination increases because a torque level may instantaneously vary according to a road condition even while the driver keeps hold of the steering wheel 1. Accordingly, it is required that the steering torque model value continues to be less than or equal to the first reference torque for the first reference time. Meanwhile, since the steering torque model value may be a positive or negative value according to the direction of the steering wheel 1, the absolute value of the steering torque model value needs to be taken for comparison with the first reference torque that has a positive value. The holding state determination unit 24 may determine a holding state in which the driver keeps hold of the steering wheel 1, by using the steering torque model value calculated by the steering torque calculation unit 23.

The holding state determination unit 24 may determine the steering wheel 1 to be in the holding state in cases where the absolute value of the calculated steering torque model value continues to exceed a second reference torque for a second reference time. The second reference torque and the second reference time may be determined through experiments. For instance, the second reference torque may be 0.31 Nm, and the second reference time may be 0.5 seconds.

The steering torque calculation unit 23 may periodically receive an electrical signal from the signal unit 10 to calculate a new steering torque model value. For instance, the steering torque calculation unit 23 may receive a renewed electrical signal to update the steering torque model value every 0.01 seconds.

The holding state determination unit 24 may use an off-counter in order to determine whether the absolute value of the calculated steering torque model value continues to be less than or equal to the first reference torque for the first reference time. For instance, the off-counter may be increased when the absolute value of the steering torque model value is less than or equal to the first reference torque. In cases where the calculated steering torque model value is less than or equal to the first reference torque at 0 seconds, the off-counter may be increased from 0 to 1, and in cases where the calculated steering torque model value is also less than or equal to the first reference torque at 0.01 seconds, the off-counter may be increased from 1 to 2.

The holding state determination unit 24 periodically repeats the calculation of the steering torque model value at every predetermined time, and compares the calculated steering torque model value with the first reference torque to increase the off-counter. The holding state determination unit 24 may determine the steering wheel 1 to be in a hands-off state when the off-counter, which has been increased for the repeated cycles, has a value that corresponds to the first reference time. For instance, in cases where the first reference time is 3 seconds, the holding state determination unit 24 determines the steering wheel to be in a hands-off state when the off-counter reaches 300.

Meanwhile, the electric power steering apparatus may output a hands-off sign when the holding state determination unit 24 determines the steering wheel to be in the hands-off state. For example, the hands-off sign may have a value of 0 or 1, and when the steering wheel is determined to be in the hands-off state, the hands-off sign may have a value of 1. The hands-off sign may have a shape that a user can directly identify. For instance, through a screen or sound, the electric power steering apparatus may warn the user that the user does not keep hold of the steering wheel 1.

Alternatively, the hands-off sign may be used as an input signal of a lane keeping control unit (not illustrated). The lane keeping control unit provides an assist torque to enable the driver to keep a lane, based on the premise that the driver keeps hold of the steering wheel 1. Accordingly, when the hands-off sign is input, the lane keeping control unit may take an action of changing a control logic or making an alert to a user.

The holding state determination unit 24 may use an on-counter in order to determine whether the absolute value of the calculated steering torque model value continues to exceed the second reference torque for the second reference time. For instance, the on-counter may be increased when the absolute value of the steering torque model value exceeds the second reference torque. In cases where the calculated steering torque model value exceeds the second reference torque at 0 seconds, the on-counter may be increased from 0 to 1, and in cases where the calculated steering torque model value also exceeds the second reference torque at 0.01 seconds, the on-counter may be increased from 1 to 2.

The holding state determination unit 24 periodically repeats the calculation of the steering torque model value at every predetermined time, and compares the calculated steering torque model value with the second reference torque to increase the on-counter. The holding state determination unit 24 may determine the steering wheel 1 to be in a holding state when the on-counter, which has been increased for the repeated cycles, has a value that corresponds to the second reference time. For instance, in cases where the second reference time is 0.5 seconds, the holding state determination unit 24 determines the steering wheel to be in a holding state when the on-counter reaches 50.

When the absolute value of the calculated steering torque model value exceeds the first reference torque and is less than or equal to the second reference torque, the holding state determination unit 24 may decrease the off-counter, and may repeat the above process by calculating a new steering torque model value after a predetermined time passes. The holding state determination unit 24 may decrease the off-counter when the absolute value of the calculated steering torque model value exceeds the first reference torque and is less than or equal to the second reference torque, thereby preventing the steering wheel 1 from being determined to be in a hands-off state due to the continually accumulated off-counter although the driver keeps hold of the steering wheel 1.

Further, when the absolute value of the calculated steering torque model value exceeds the first reference torque and is less than or equal to the second reference torque, the holding state determination unit 24 may decrease the on-counter, and may repeat the above process by calculating a new steering torque model value after a predetermined time passes. The holding state determination unit 24 may decrease the on-counter when the absolute value of the calculated steering torque model value exceeds the first reference torque and is less than or equal to the second reference torque, thereby preventing the steering wheel 1 from being determined to be in a holding state due to the continually accumulated on-counter although the driver does not keep hold of the steering wheel 1.

The holding state determination unit 24 may reset the on-counter when the absolute value of the calculated steering torque model value is less than or equal to the first reference torque. Furthermore, the holding state determination unit 24 may reset the off-counter when the absolute value of the calculated steering torque model value exceeds the second reference torque.

The first reference torque is a maximum reliable value for a hands-off state, and the second reference torque is a minimum reliable value for a holding state. Accordingly, when the absolute value of the calculated steering torque model value is less than or equal to the first reference torque, the holding state determination unit 24 determines the steering wheel to be in a hands-off state and resets the on-counter to a value of 0, and when the absolute value of the calculated steering torque model value exceeds the second reference torque, the holding state determination unit 24 determines the steering wheel to be in a holding state and resets the off-counter to a value of 0.

Meanwhile, as described above, the off-counter and the on-counter may all be decreased when it is unclear whether the steering wheel is in a holding state or in a hands-off state, that is, when the absolute value of the calculated steering torque model value is between the first reference torque and the second reference torque.

Next, a method of controlling the electric power steering apparatus, according to an exemplary embodiment of the present invention, will be described with reference to FIG. 4.

In the method of controlling the electric power steering apparatus, according to the exemplary embodiment of the present invention, a steering torque model value is calculated through a predefined steering torque model equation using electrical signals that are output from the torque sensor 12 and the steering angle sensor 11 (Step 101), wherein the torque sensor 12 detects a torque that a driver applies to the steering wheel 1 and outputs an electrical signal that corresponds to the detected torque, and the steering angle sensor 11 outputs an electrical signal that corresponds to the rotation angle of the steering wheel 1. The process of calculating the steering torque model value may be periodically repeated at every predetermined time, and a new steering torque model value may be updated, for example, every 0.01 seconds.

Next, a determination is made as to whether the absolute value of the calculated steering torque model value is less than or equal to a first reference torque (Step 102). The first reference torque is a maximum value by which the driver is determined not to keep hold of the steering wheel 1. When it is determined that the absolute value of the calculated steering torque model value is less than or equal to the first reference torque, an off-counter associated with the duration time of a hands-off state is increased (Step 103). Meanwhile, an on-counter associated with the duration time of a holding state may be reset (Step 104). However, the on-counter may also be decreased, instead of being reset. The absolute value of the steering torque model value may be less than or equal to the first reference torque as the driver turns the steering wheel 1 from the positive direction to the negative direction while the driver keeps hold of the steering wheel 1, in which case the on-counter is reset (Step 104) because the case does not agree with the situation where the driver keeps hold of the steering wheel 1.

Next, a determination is made as to whether the value of the off-counter corresponds to a first reference time (Step 105). In the exemplary embodiment of the present invention, in cases where the driver may be determined not to keep hold of the steering wheel 1, the determination is not made immediately, but when the situation continues for a predetermined period of time. Namely, in cases where the off-counter associated with the duration time of a hands-off state does not reach the value that corresponds to the first reference time, a new steering torque model value is calculated again, and in cases where the off-counter agrees with the value that corresponds to the first reference time, the steering wheel is determined to be in a hands-off state (Step 106).

When the steering wheel is determined to be in the hands-off state, a hands-off sign may be changed (Step 107). For example, the hands-off sign may be changed from 0 to 1, and the changed sign may be used in the control unit 20, or may be transmitted to the outside. The changed sign may be transmitted, for example, as an input signal that informs the lane keeping control unit that the driver does not keep hold of the steering wheel 1.

Meanwhile, in cases where the steering wheel is determined to be in the hands-off state, the off-counter may be reset (Step 108). Since the hands-off sign is already changed, the hands-off state may be maintained even though the off-counter is reset to 0. Namely, the hands-off state is maintained irrespective of the magnitude of the off-counter unless the hands-off sign is changed to 0 again.

Next, in the process (Step 102) of determining whether the absolute value of the calculated steering torque model value is less than or equal to the first reference torque, a case where the absolute value of the calculated steering torque model value exceeds the first reference torque will be described. In this case, a determination is made as to whether the calculated steering torque model value is less than or equal to a second reference torque (Step 109). Meanwhile, the two steps 102 and 109 may also be simultaneously performed. Namely, a determination may be made as to whether the calculated steering torque model value exceeds the first reference torque and is less than or equal to the second reference torque.

When it is determined that the calculated steering torque model value is less than or equal to the second reference torque, both the off-counter and the on-counter are decreased (Steps 110 and 111). Since the first reference torque refers to a maximum value by which the steering wheel may be determined to be in a hands-off state, and the second reference torque refers to a minimum value by which the steering wheel may be determined to be in a holding state, it is possible to prevent the off-counter and the on-counter from being continually accumulated by decreasing both the off-counter and the on-counter when the calculated steering torque model value is between the first reference torque and the second reference torque.

Meanwhile, the decreasing magnitude of the off-counter and the on-counter may be optimized by an experiment, and the off-counter and the on-counter may be decreased to the same value or to different values. For example, the off-counter and the on-counter may all be decreased to a value of −1.

Next, in the process (Step 109) of determining whether the absolute value of the calculated steering torque model value is less than or equal to the second reference torque, a case where the absolute value of the calculated steering torque model value exceeds the second reference torque will be described. When the absolute value of the calculated steering torque model value exceeds the second reference torque, the on-counter associated with the duration time of a holding state is increased (Step 112), and the off-counter associated with the duration time of a hands-off state is reset (Step 113).

Next, a determination is made as to whether the value of the on-counter corresponds to a second reference time (Step 114). In the exemplary embodiment of the present invention, in cases where the driver may be determined to keep hold of steering wheel 1, the determination is not made immediately, but when the situation continues for a predetermined period of time. Accordingly, in cases where the on-counter associated with the duration time of a holding state does not reach the value that corresponds to the second reference time, a new steering torque model value is calculated again, and in cases where the on-counter agrees with the value that corresponds to the second reference time, the steering wheel is determined to be in a holding state (Step 115).

When the steering wheel is determined to be in the holding state, the hands-off sign may be changed (Step 116). For example, the hands-off sign may be changed from 1 to 0, and the changed sign may be used in the control unit 20, or may be transmitted to the outside. The changed sign may be transmitted, for example, as an input signal that informs the lane keeping control unit that the driver keeps hold of the steering wheel 1.

Meanwhile, in cases where the steering wheel is determined to be in the holding state, the on-counter may be reset (Step 117). Since the hands-off sign is already changed, the holding state may be maintained even though the on-counter is reset to 0. Namely, the holding state is maintained irrespective of the magnitude of the on-counter unless the hands-off sign is changed to 1 again.

Referring to FIG. 5, the magnitude of a calculated steering wheel torque value that is calculated on the basis of a steering angle, the magnitudes of an off-counter and an on-counter that vary depending on the magnitude of the calculated steering wheel torque value, and a change in the magnitude of a hands-off sign that varies depending on the magnitudes of the off-counter and the on-counter may be identified.

For instance, it can be seen that the off-counter starts to increase around 2 seconds when the magnitude of the absolute value of the calculated steering wheel torque value becomes smaller than 0.26 Nm. The off-counter may gradually increase from 0 to 300 in the time range of 2 to 5 seconds. Alternatively, the off-counter may decrease when the magnitude of the absolute value of the calculated steering wheel torque value becomes larger than 0.26 Nm in the meantime. However, the magnitude of the absolute value of the calculated steering wheel torque value does not exceed 0.31 Nm. If the magnitude of the absolute value of the calculated steering wheel torque value exceeds 0.31 Nm, the off-counter may have been reset to 0.

As soon as the off-counter increases to 300, the hands-off sign is changed from 0 to 1, and the off-counter is reset to 0. Accordingly, the hands-off sign is maintained to be 1 although the magnitude of the off-counter is 0 in the time range of 5 to 6.5 seconds.

Meanwhile, it can be seen that the on-counter starts to increase around 6 seconds when the magnitude of the absolute value of the calculated steering wheel torque value becomes larger than 0.31 Nm. The on-counter may gradually increase from 0 to 50 in the time range of 6 to 6.5 seconds. Alternatively, the on-counter may decrease when the magnitude of the absolute value of the calculated steering wheel torque value becomes smaller than 0.31 Nm in the meantime.

As soon as the on-counter increases to 50, the hands-off sign is changed from 1 to 0, and the on-counter is reset to 0. Accordingly, the hands-off sign is maintained to be 0 although the magnitude of the on-counter is 0 after 6.5 seconds.

As described above, in the exemplary embodiment of the present invention, the on-counter and the off-counter are controlled by separating the reference value for determining whether a driver keeps hold of the steering wheel into the first reference torque and the second reference torque, which makes it possible to accurately determine whether the driver keeps hold of the steering wheel even though a torque level temporarily changes due to a road condition, etc.

Such a configuration will be described below in more detail with reference to FIGS. 6 and 7.

Figure 6:
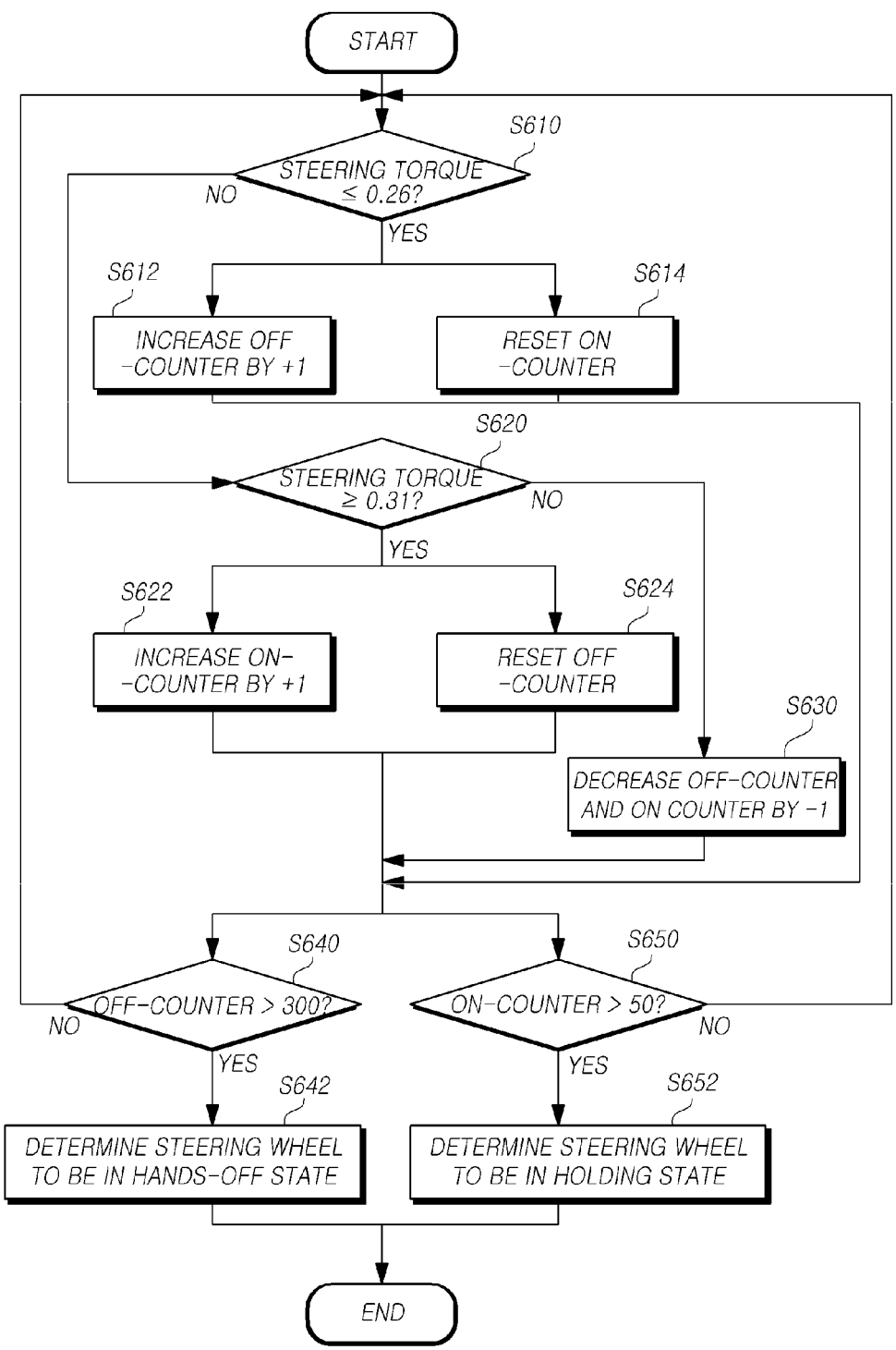
FIG. 6 is a flowchart illustrating a process in which a steering control device determines whether a driver keeps hold of a steering wheel, according to an exemplary embodiment of the present invention.

FIG. 6 is a flowchart illustrating a process in which a steering control device determines whether a driver keeps hold of a steering wheel, according to an exemplary embodiment of the present invention, where a configuration that uses an on-counter, an off-counter, and two reference torques (first and second reference torques) is illustrated.

For convenience, it is assumed that a period of determination in which the holding state of the steering wheel is determined by comparing a calculated steering torque model value with the first and second reference torques is 0.01 seconds, and the on-counter and the off-counter may be renewed (increased, decreased, or reset) every 0.01 seconds that is the period of determination.

Further, the first and second reference torques are 0.26 Nm and 0.31 Nm, respectively. A first reference time, on the basis of which the steering wheel is finally determined to be in a hands-off state, is 3 seconds, and the value of the off-counter that corresponds to the first reference time is represented as a first reference counter value. A second reference time, on the basis of which the steering wheel is finally determined to be in a holding state, is 0.05 seconds, and the value of the on-counter that corresponds to the second reference time is represented as a second reference counter value.

Namely, in cases where the steering torque model value is less than 0.26 Nm, the off-counter is increased by a value of 1, and when the value of the off-counter reaches 300 (that is, when 3 seconds pass), the steering wheel is determined to be in a hands-off state because the first reference time has elapsed.

First, the steering torque model value is compared with the first reference torque (0.26 Nm) (S610), and when it is determined that the steering torque model value is less than the first reference torque (0.26 Nm), the off-counter is increased by a value of 1 (S612), and the on-counter is simultaneously reset to 0 (S614).

When the steering torque model value exceeds the first reference torque (0.26 Nm), the steering torque model value is compared with the second reference torque (0.31 Nm) (S620), and when it is determined that the steering torque model value exceeds the second reference torque (0.31 Nm), the on-counter is increased by a value of 1 (S622), and the off-counter is simultaneously reset to 0 (S624).

In contrast, when the result obtained by comparing the steering torque model value with the first reference torque (0.26 Nm) and the second reference torque (0.31 Nm) shows that the steering torque model value is between the first reference torque (0.26 Nm) and the second reference torque (0.31 Nm), the off-counter and the on-counter are decreased by a value of 1 (S630).

Of course, since the on-counter and the off-counter in the present invention cannot have negative values, the counter values do not have to be decreased when the current values of the on-counter and the off-counter are 0.

Then, the current value of the off-counter is compared with the first reference counter value (300) (S640), and when it is determined that the current value of the off-counter exceeds the first reference counter value (300), the steering wheel is finally determined to be in a hands-off state (S642).

Likewise, the current value of the on-counter is compared with the second reference counter value (50) (S650), and when it is determined that the current value of the on-counter exceeds the second reference counter value (50), the steering wheel is finally determined to be in a holding state (S652).

FIGS. 7A and 7B illustrate a variation in a steering torque model value according to time and a variation in values of an on-counter and an off-counter according to the steering torque variation.

FIG. 7A illustrates a case in which a steering torque model value: is maintained at 0.2 Nm, which is less than the first reference torque (0.26 Nm), for 2 seconds; changes to 0.29 Nm, which is between the first reference torque (0.26 Nm) and the second reference torque (0.31 Nm), in the time range of 2.0 to 2.1 seconds; returns to 0.2 Nm, which is less than the first reference torque (0.26 Nm), in the time range of 2.1 to 2.3 seconds; changes to 0.29 Nm, which is between the first reference torque (0.26 Nm) and the second reference torque (0.31 Nm), in the time range of 2.3 to 2.4 seconds; and is thereafter maintained at 0.2 Nm again.

In this case, the off-counter value continually increases to 200 for 2 seconds, and then decreases by a value of 1 every 0.01 seconds to reach 190 at 2.1 seconds because the steering torque model value is between the first reference torque and the second reference torque in the time range of 2.0 to 2.1 seconds.

The off-counter value is 210 at 2.3 seconds, decreases to 200 again at 2.4 seconds, and continually increases after 2.4 seconds in the same way.

Consequently, the off-counter value becomes 300 after 3.4 seconds have elapsed from the first time point, and a steering wheel is determined to be in a hands-off state.

Hereinafter, effects of the configuration that uses the two reference torque values and the two counters as described above will be described.

In an actual road environment, a steering torque exceeding a predetermined reference may be detected according to a road condition, a weather condition, a minute obstacle on a road, etc. even while a driver does not keep hold of a steering wheel.

For example, in a road condition, such as an unpaved road, etc., a steering torque component may be generated by an external load, which is inversely input through a rack bar of a steering system, irrespective of a driver's intention of steering a vehicle. In this case, a measured or calculated steering torque value does not precisely reflect whether the driver keeps hold of the steering wheel.

Meanwhile, in a general method of determining the holding state of a steering wheel by using a steering torque value, an instantaneous holding state is determined by comparing a measured steering torque value with one reference value, and in some cases, it may be finally determined whether a driver keeps hold of a steering wheel when the instantaneous holding state continues for a predetermined period of time.

Accordingly, even though a driver does not keep hold of a steering wheel, a steering torque value may temporarily exceed a reference value for a predetermined period of time and then return to a value less than the reference value according to a road environment, and in this case, a holding state and a hands-off state may be changed every time in the general determination method.

Further, irrespective of a road condition, a driver may drive a vehicle while temporarily not keeping hold of a steering wheel on purpose because of a manipulation of a cellular phone, light stretching, etc.

As described above, since whether a driver keeps hold of a steering wheel may be used as a reference for determining a steering assistance or automatic steering control operation as in a lane keeping control system etc., the On/Off of the steering control operation may be rapidly changed in a predetermined road environment or in a deliberate operation of not keeping hold of a steering wheel, and in this case, it is impossible to ensure vehicle stability as well as driver convenience.

However, in the exemplary embodiment of the present invention, it is possible to accurately determine whether a driver keeps hold of a steering wheel even when a steering torque temporarily varies according to a road condition, etc, by determining the first reference torque and the second reference torque, on the basis of which a hands-off state or a holding state may be clearly determined, and decreasing the off/on counters when a steering torque model value is between the two reference torques.

In particular, as described above with reference to FIG. 7A, using the configuration of the present invention, a final determination as to whether a driver keeps hold of a steering wheel is made after the first set reference time when a case where a steering torque model value is between the two reference torques occurs frequently or for a long time, so that the determination can be more carefully made according to a road condition, etc.

Further, in the exemplary embodiment of the present invention, the first reference time or the first counter value, on the basis of which a steering wheel is determined to be in a hands-off state, is set to be greater than the second reference time or the second counter value, on the basis of which the steering wheel is determined to be in a holding state, and the first reference time or the first counter value is preferably at least two times or more as large as the second reference time or the second counter.

As described above, whether to operate a lane keeping control system is determined according to a determination as to whether a driver keeps hold of a steering wheel. More specifically, the lane keeping control system operates only when the steering wheel is held, and the control of the currently operated lane keeping control system is completed when the steering wheel is changed to a hands-off state.

Accordingly, when the steering wheel is determined to be in the hands-off state, the operation of the lane keeping control system may be completed, and in this case, it may be difficult to keep a lane, which causes a great risk to vehicle stability.

In contrast, since a determination that the steering wheel is in a holding state means that the currently operated lane keeping control system is continually maintained, the vehicle stability is less affected than when the steering wheel is determined to be in the hands-off state.

Accordingly, as in the present invention, the first reference time or the first counter value, on the basis of which the steering wheel is determined to be in the hands-off state, may be set to be greater than the second reference time or the second counter value, on the basis of which the steering wheel is determined to be in the holding state, so as to carefully determine whether the operation of the lane keeping control system is completed according to the determination that the steering wheel is in the hands-off state, thereby ensuring vehicle stability.

Further, the determination that the steering wheel is in the holding state, according to the exemplary embodiment of the present invention, corresponds to a driving state in which a lane keeping control system, a Traffic Jam Assist (TJA), etc. are operating, and in the driving state, a case in which a driver keeps hold of the steering wheel generally corresponds to a normal state.

Namely, since the hands-off state of the steering wheel corresponds to an abnormal state, the first reference time or the first counter value, on the basis of which the steering wheel is determined to be in the hands-off state, is set to be greater than the second reference time or the second counter value, on the basis of which the steering wheel is determined to be in the holding state, in order to carefully determine the abnormal state.

Meanwhile, FIG. 7B illustrates a case in which a steering torque model value is the same as that in FIG. 7A in the time range of 0 to 2.4 seconds and increases to 0.4 Nm, which exceeds the second reference torque (0.31 Nm), at 2.5 seconds.

In this case, as described above with reference to FIG. 7A, the off-counter value is 200 at 2.4 seconds, increases to 210 at 2.5 seconds, and is reset to 0 at the same time that the steering torque model value increases to 0.4 Nm.

Meanwhile, the on-counter increases by a value of 1 after 2.5 seconds and reaches 50, which is the second reference counter value, at 3.0 seconds so that the steering wheel is finally determined to be in a holding state.

As described above, in cases where the steering torque model value varies within the predetermined range, only the determination time point is delayed by decreasing the counter value by a value of 1, and in cases where the steering torque model value is beyond the predetermined range, the corresponding counter is reset, which makes it possible to accurately detect the instantaneous holding/hands-off states while performing gradual compensation for the temporary minute variation in the steering torque.

Figure 8:
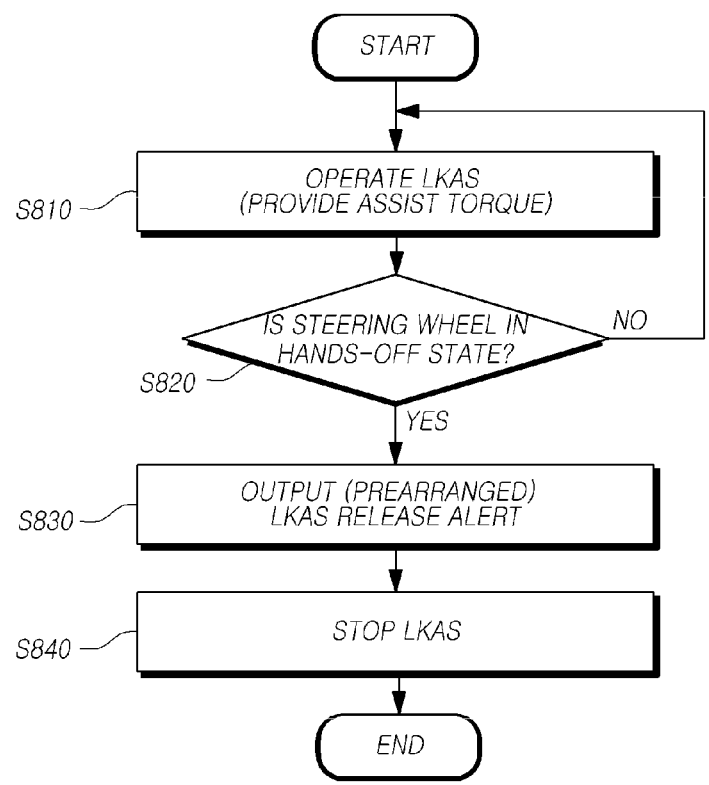
FIG. 8 is a flowchart illustrating a process of determining whether a steering wheel is in a hands-off state and controlling the operation of a lane keeping control system, according to an exemplary embodiment of the present invention.

FIG. 8 is a flowchart illustrating a process of determining whether a steering wheel is in a hands-off state and controlling the operation of a lane keeping control system, according to an exemplary embodiment of the present invention.

As described above, when a steering wheel is determined to be in a hands-off state according to the present invention, the control of the lane keeping control system, which is operating while the steering wheel is in the hands-off state, is completed.

Since the completion of the lane keeping control system means that the lane keeping control system no longer controls lane-keeping irrespective of a driver's intention, if the driver does not manually operate the steering wheel assuming that the lane-keeping control is maintained, a great risk to vehicle stability may arise.

Accordingly, in the present invention, as illustrated in FIG. 8, the lane keeping control system, which generates and provides an auxiliary torque to maintain a lane while the steering wheel is in a holding state, is assumed to operate (S810).

When the steering wheel is determined to be in a hands-off state through the above-described method (S820), a prearranged alert for releasing the lane keeping control system is output to the driver through a sound or a display (S830).

Then, after a predetermined period of time passes, the operation of the lane keeping control system is released (S840).

For instance, in the example illustrated in FIG. 7A, the steering wheel may be determined to be in a hands-off state at the time point when 3.4 seconds has elapsed from the first determination time point, and a prearranged alert for releasing the lane keeping control system may be output at the same time. Then, the operation of the lane keeping control system may be actually released at 4.4 seconds after about 1 second has elapsed.

Through the above-described configuration, it is possible to further ensure vehicle stability when determining whether the steering wheel is in a hands-off state and completing the operation of the lane keeping control system according to the determination result.

As described above, according to the present invention, whether a driver keeps hold of a steering wheel can be accurately determined by using a steering torque model value that is derived from modeling of a steering system, other than a actually measured steering torque value.

Further, a steering wheel is determined to be in a hands-off state only when a steering torque model value is less than or equal to a minimum reference value (the first reference torque) for a predetermine period of time (the first reference time), and compensation is conducted by gradually decreasing a counter value when the steering torque model value minutely varies between two reference values (the first and second reference torques), thereby accurately and carefully determining whether a driver keeps hold of the steering wheel even when the steering torque temporarily varies according to a road condition, etc.

In addition, a configuration for setting the first reference time, on the basis of which a steering wheel is determined to be in a hands-off state, to be greater than the second reference time, on the basis of which the steering wheel is determined to be in a holding state, or a configuration for making an alert regarding the release of a lane keeping control system according to the determination that a steering wheel is in a hands-off state is provided to carefully determine whether to complete the operation of the lane keeping control system according to the determination that the steering wheel is in the hands-off state, thereby ensuring stability of a vehicle.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | |
|---|---|
| 1: Steering wheel | 2: Steering column |
| 3: Pinion shaft | 4: Pinion |
| 5: Rack shaft | 6: AFS actuator |
| 7: EPS actuator | 10: Signal unit |
| 11: Steering angle sensor | 12: Torque sensor |
| 20: Control unit | 21: AFS ECU |
| 22: EPS ECU | |
| 23: Steering torque calculation unit | |
| 24: Holding state determination unit | |

What is claimed is:

1. An electric power steering apparatus, comprising:
a torque sensor that detects a steering torque applied to a steering wheel of a vehicle and outputs a steering torque electrical signal corresponding to the detected steering torque;
a steering angle sensor that detects a rotation angle of the steering wheel and outputs a steering angle electrical signal corresponding to the rotation angle of the steering wheel;
a steering torque calculation unit that calculates a steering torque model value through a predefined steering torque model equation by using a steering torque value based on the steering torque electrical signal that is output from the torque sensor, a steering angle speed value and a steering angle acceleration value based on the steering angle electrical signal that is output from the steering angle sensor;
a holding state determination unit that determines a hands-off state in which a driver does not keep hold of the steering wheel, by using the steering torque model value, which is calculated based on the both of the steering torque electrical signal and the steering angle electrical signal by the steering torque calculation unit; and
an off-counter that updates an off-counter value at every period of determination,
wherein the holding state determination unit determines the hands-off state of the steering wheel by using a first reference torque, a second reference torque larger than the first reference torque, and the accumulated counter value of the off-counter, and
the holding state determination unit: determines, at every period of determination, whether the absolute value of the calculated steering torque model value is less than or equal to the first reference torque; increases the counter value of the off-counter by a predetermined value only when the absolute value of the calculated steering torque model value is less than or equal to the first reference torque; determines that the driver does not keep hold of the steering wheel when the accumulated counter value of the off-counter reaches a first reference counter value corresponding to a first reference time; and decreases the counter value of the off-counter by a predetermined value when the absolute value of the steering torque model value exceeds the first reference torque and is less than the second reference torque.

2. The electric power steering apparatus of claim 1, further comprising:
an on-counter, the counter value of which is updated at every period of determination,
wherein the holding state determination unit: determines, at every period of determination, whether the absolute value of the calculated steering torque model value exceeds the second reference torque; increases the counter value of the on-counter by a predetermined value only when the absolute value of the calculated steering torque model value exceeds the second reference torque; determines that the driver keeps hold of the steering wheel when the accumulated counter value of the on-counter reaches a second reference counter value corresponding to a second reference time; and decreases the counter value of the on-counter by a predetermined value when the absolute value of the steering torque model value exceeds the first reference torque and is less than the second reference torque.

3. The electric power steering apparatus of claim 2, wherein the holding state determination unit: compares the absolute value of the calculated steering torque model value with the first and second reference torques at every period of determination; resets the on-counter when the absolute value of the steering torque model value is less than or equal to the first reference torque; and resets the off-counter when the absolute value of the steering torque model value exceeds the second reference torque.

4. The electric power steering apparatus of claim 2, wherein the first reference counter value is larger than the second reference counter value.

5. The electric power steering apparatus of claim 1, wherein an alert for releasing the operation of a lane keeping control system, which is provided in the vehicle, is made when it is determined that the driver does not keep hold of the steering wheel, and the operation of the lane keeping control system is completed after a predetermined time from the time point of the alert.

6. The electric power steering apparatus of claim 5, wherein a hands-off sign is output when it is determined that the driver does not keep hold of the steering wheel.

7. A method of controlling an electric power steering apparatus by using a device that comprises a steering torque calculation unit, an off-counter, and a holding state determination unit, comprising:
a steering torque calculation step of calculating, by the steering torque calculation unit, a steering torque model value through a predefined steering torque model equation by using both of steering torque information including a steering torque value applied to a steering wheel and steering angle information including a steering angle speed value and a steering angle acceleration value, wherein the steering torque information is output from a torque sensor, and the steering angle information is output from a steering angle sensor;
a counter update step of updating the counter value of the off-counter at every period of determination according to a result obtained by comparing the steering torque model value with a first reference torque and a second reference torque larger than the first reference torque; and
a holding state determination step of determining, by the holding state determination unit, whether a driver keeps hold of a steering wheel, based on the counter value of the off-counter and the both of the steering torque information and the steering angle information,
wherein the holding state determination unit: determines, at every period of determination, whether the absolute value of the calculated steering torque model value is less than or equal to the first reference torque; increases the counter value of the off-counter by a predetermined value only when the absolute value of the calculated steering torque model value is less than or equal to the first reference torque; determines that the driver does not keep hold of the steering wheel when the accumulated counter value of the off-counter reaches a first reference counter value corresponding to a first reference time; and decreases the counter value of the off-counter by a predetermined value when the absolute value of the steering torque model value exceeds the first reference torque and is less than the second reference torque.

8. The method of claim 7, wherein the device further comprises an on-counter, the counter value of which is updated at every period of determination, and
the holding state determination unit: determines, at every period of determination, whether the absolute value of the calculated steering torque model value exceeds the second reference torque; increases the counter value of the on-counter by a predetermined value only when the absolute value of the calculated steering torque model value exceeds the second reference torque; determines that the driver keeps hold of the steering wheel when the accumulated counter value of the on-counter reaches a second reference counter value corresponding to a second reference time; and decreases the counter value of the on-counter by a predetermined value when the absolute value of the steering torque model value exceeds the first reference torque and is less than the second reference torque.

9. The method of claim 8, wherein the holding state determination unit: compares the absolute value of the calculated steering torque model value with the first and second reference torques at every period of determination; resets the on-counter when the absolute value of the steering torque model value is less than or equal to the first reference torque; and resets the off-counter when the absolute value of the steering torque model value exceeds the second reference torque.

10. The method of claim 8, wherein the first reference counter value is larger than the second reference counter value.

11. The method of claim 7, further comprising:
an alert step of making an alert for releasing the operation of a lane keeping control system, which is provided in the vehicle, when it is determined that the driver does not keep hold of the steering wheel.

12. The method of claim 11, further comprising:
a hands-off sign output step of outputting a hands-off sign when it is determined that the driver does not keep hold of the steering wheel.

* * * * *